July 14, 1931.　　　J. B. BANDER　　　1,814,540
READING GLASS
Filed March 4, 1930　　2 Sheets-Sheet 2
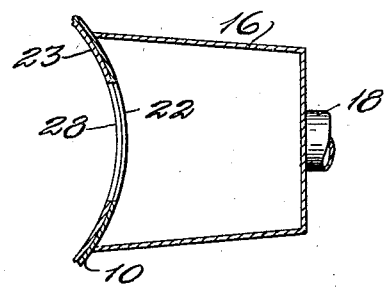
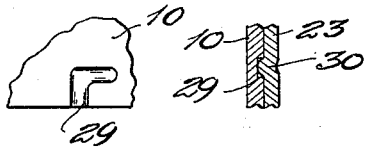
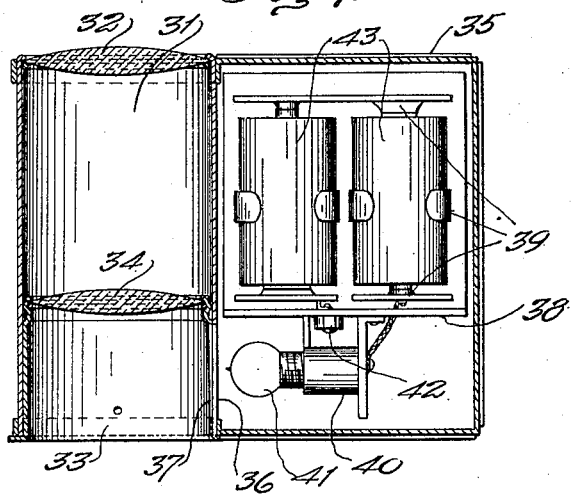
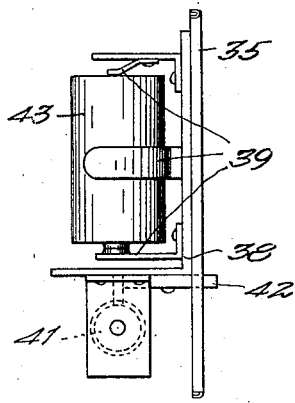
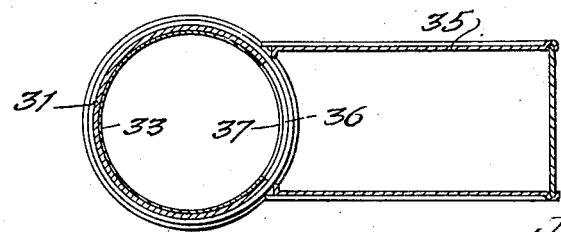
INVENTOR.
Jacob B. Bander,
BY
ATTORNEYS.

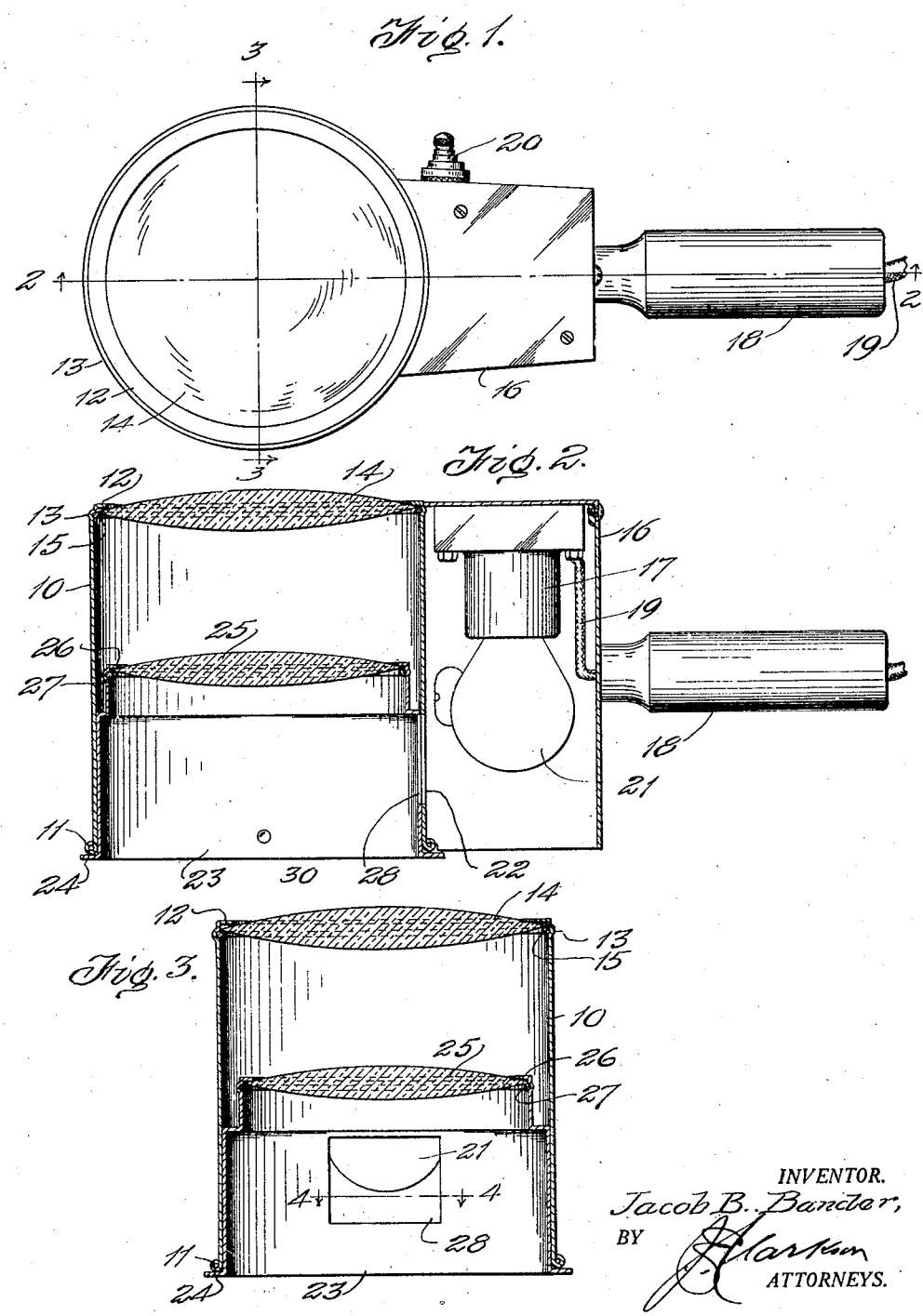

Patented July 14, 1931

1,814,540

UNITED STATES PATENT OFFICE

JACOB B. BANDER, OF NEWARK, NEW JERSEY

READING GLASS

Application filed March 4, 1930. Serial No. 433,149.

This invention relates to reading glasses and has special reference to a reading or magnifying glass having means for illuminating the page to be read or object to be magnified with diffused light.

In my prior application, Serial Number 282,531 filed June 4, 1928, I have shown and described a reading glass of this general type employing a single lens. It has been found, however, that this glass, though very useful and satisfactory to most people is not so fully satisfactory to others due to the differences which exist in variations from normal eyesight in different persons. For instance, in order to make reading or inspection easy and pleasant for two different people one may require a glass of much greater magnifying power than the other. It has also been found that, as a rule, cases requiring the use of reading glasses for comfort may be divided into two general classes; those which are satisfied by a relatively low magnification and those which can only be satisfied by high magnification. This is so because persons using reading glasses frequently use also eyeglasses or spectacles in connection with such reading glasses. It is also found that the same person reading large type printing will require less magnification than when reading printing from small type and that, for all practical purposes this again may be divided into the need for relatively low magnification and the need for high magnification. Obviously, this dual need may be met by the employment of two reading glasses; one having a lens of relatively low power and the other having a lens of relatively high power. This, however, is an expensive and insufficient expedient.

It is therefore, one object of the present invention to provide an improved form of reading glass of this type described, wherein the magnification may be made low or high as desired.

In the form of the invention shown in my prior application the glass, while readily portable, requires connection to a lamp socket or the like. Thus such a glass, valuable as it is in the usual home or office, cannot be used in places unprovided with electrical connections. For instance, many people wish to read in sleeping cars after they have retired, others are called on to move around lodge halls while reading, and still others have to inspect textures of fabrics and the like at different places. Such things cannot well be done where it is necessary to connect the glass to a fixed source of electricity.

A second important object of the invention is, therefore, to provide an improved form of glass of this character carrying its own source of electricity so as to be portable in the fullest meaning of the word.

With the above and other objects in view, as will be presently understood, the invention consists in general of certain novel features of construction and combinations of parts hereinafter fully described, illustrated in the accompanying drawings and specifically claimed.

In the accompanying drawings like characters of reference indicate like parts in the several views, and:

Figure 1 is a plan view of one form of the invention.

Figure 2 is a section on the line 2—2 of Figure 1.

Figure 3 is a section on the line 3—3 of Figure 1.

Figure 4 is a section on the line 4—4 of Figure 3.

Figure 5 is an enlarged detail showing a bayonet slot used to hold the parts together.

Figure 6 is a section on the line 6—6 of Figure 5.

Figure 7 is a section similar to Figure 2 but showing a second form of the invention.

Figure 8 is a detail showing the manner of supporting the batteries and lamp in this second form.

Figure 9 is a section through the body and lamp housing on the line 9—9 of Figure 7.

In the form shown in Figures 1 to 6 there is provided a tubular body 10 having a beaded lower edge or rim 11. The top of this body is flanged inwardly to provide a lip 12 and spaced below the lip is a channel formed by rolling the metal of the body outwardly as at 13. A lens 14 is fitted in the upper end of the body and has the upper face of its peripheral portion engaged against the lip 12. A snap ring 15 seats in the channel and engages the under side of the lens to hold the lens securely in the body. At one side of the body is a lamp housing 16 which is open at the bottom and has a lamp socket 17 of standard type mounted within the housing on the top thereof. A handle 18 projects from this housing and is provided with a suitable bore through which the wires 19 pass to the socket, a standard switch 20 being interposed in one of these wires so that the lamp 21 mounted in the socket 17 may be turned on or off. Between the housing 16 and the body 10 there is provided a port or window 22 which is positioned close to the bottom of the body, the upper edge of this window being substantially on a level with the center of illumination of the lamp so that no rays from this center of illumination can strike directly on or produce a glare on the lens to interfere with vision through said lens. In fact, as thus constructed no rays from the center of illumination can rise, in the body, above the level of the top of the window.

The lower end of the body 10 is open and a lens carrier or tube 23 having an outwardly extending flange 24 is fitted in this lower end slidably and rotatably, the flange 24, when the lens tube is fully inserted, engaging against the bead 11. In the upper end of this tube is mounted a lens 25 which is secured in position in the same manner as the lens 14 by a lip 26 and snap ring 27. A window 28 is formed in the lens tube 23 and is arranged, upon the lens tube being fully inserted, to register with the window 22. In order to hold the lens tube properly positioned in the body there is struck out at the lower part of the body a bayonet lock channel 29 which is engaged by a boss 30 struck out from the lens tube. These parts are so positioned that, upon sliding the boss up into the channel 29 and then rotating the lens tube the boss will engage the inner end of the channel and stop further rotative movement and in this position of the tube the windows 28 and 22 will be in registry. When thus positioned the two lenses will be in proper optical relation.

The body, housing and lens tube are all made of aluminum or other material having the property of diffusing light or may be lined or coated with light diffusing material such as aluminum paint or the like. Also the lamp is preferably of the frosted type.

In the form of the invention shown in Figures 7 to 9 the construction of the main features is very similar to that of the first form. That is, this form has a tubular body 31 carrying a lens 32 at its upper end and having a lens tube 33 carrying a lens 34 fitted removably in the lower end of the body. A housing 35 is formed on one side of the body and communicates with the interior of the body and tube through windows 36 and 37. This housing is closed at its bottom and in the housing is a suitable insulated frame 38 supporting battery clips 39 and a lamp socket 40 carrying a lamp 41. The socket is connected to the battery clips through a switch 42 and batteries 43 are removably mounted in said clips. This form is thus fully portable.

While this invention has been called a reading glass, and is so designated in the claims, it is to be understood that it is not limited to a glass for reading printed matter or the like but the term reading glass as herein used is to be understood as broad enough to cover magnifying glasses of this character for all purposes such as reading printed matter, examining material of various sorts, used by surgeons and others to illuminate parts of a persons anatomy and in fact for all uses to which a magnifying glass may be put.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new is:

1. In a reading glass, an open bottomed body having a lateral window in its lower portion, a lamp housing fixed to the body around said window, a lamp in said housing, a lens closing the upper end of the body, and a second lens removably fitted in the body above said window, said lamp being positioned in the housing at such distance from the window as to be hidden from observation through the upper lens and to have all rays emanating therefrom and striking a surface being read reflected from the surface to points without the periphery of the upper lens.

2. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, and a second lens carried by the upper end of the lens tube.

3. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, a second lens carried by the upper end of the lens tube, and means on the body and tube cooperating to guide the lens tube into position with its window registering with the window in the body.

4. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, and a second lens carried by the upper end of the lens tube, said body and tube having their interior surfaces arranged to cause diffusion of the light entering the windows from the lamp.

5. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, a second lens carried by the upper end of the lens tube, and means on the body and tube cooperating to guide the lens tube into position with its window registering with the window in the body, said body and tube having their interior surfaces arranged to cause diffusion of the light entering the windows from the lamp.

6. In a reading glass, an open bottomed body having a lateral window in its lower portion, a lamp housing fixed to the body around said window, a lamp in said housing, a lens closing the upper end of the body, a battery in said housing having connection with said lamp, and a switch interposed in the connection between the battery and lamp, said lamp being positioned in the housing at such distance from the window as to be hidden from observation through the upper lens and to have all rays emanating therefrom and striking a surface being read reflected from the surface to points without the periphery of the upper lens.

7. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, a second lens carried by the upper end of the lens tube, a battery in said housing having connection with said lamp, and a switch interposed in the connection between the battery and lamp.

8. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, a second lens carried by the upper end of the lens tube, means on the body and tube cooperating to guide the lens tube into position with its window registering with the window in the body, a battery in said housing having connection with said lamp, and a switch interposed in the connection between the battery and lamp.

9. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, a second lens carried by the upper end of the lens tube, said body and tube having their interior surfaces arranged to cause diffusion of the light entering the windows from the lamp, a battery in said housing having connection with said lamp, and a switch interposed in the connection between the battery and lamp.

10. In a reading glass, an open bottomed body having a lateral window in its lower portion, a lamp housing fixed to the body around said window, a lamp in said housing, a lens closing the upper end of the body, a lens tube removably fitted in the lower end of said body and provided with a window arranged to register with the first window when the tube is properly positioned in the body, a second lens carried by the upper end of the lens tube, means on the body and tube cooperating to guide the lens tube into position with its window registering with the window in the body, said body and tube having their interior surfaces arranged to cause diffusion of the light entering the windows from the lamp, a battery in said housing having connection with said lamp, and a switch interposed in the connection between the battery and lamp.

In testimony whereof I affix my signature.

JACOB B. BANDER.